United States Patent [19]
Takura

[11] Patent Number: 6,097,126
[45] Date of Patent: Aug. 1, 2000

[54] THREE-PHRASE RELUCTANCE MOTOR

[75] Inventor: Toshiyasu Takura, Hino, Japan

[73] Assignee: Toshiba Tec Kabushiki Kaisha, Tokyo, Japan

[21] Appl. No.: 09/158,363

[22] Filed: Sep. 22, 1998

[30] Foreign Application Priority Data

Sep. 24, 1997 [JP] Japan ................................. 9-258368
Jul. 13, 1998 [JP] Japan ................................ 10-197159

[51] Int. Cl.⁷ ................................................. H02K 17/00
[52] U.S. Cl. ..................... 310/166; 318/701; 318/156; 318/261; 318/168
[58] Field of Search .................. 318/701; 310/49 R, 310/156, 162, 168, 166, 261, 269

[56] References Cited

U.S. PATENT DOCUMENTS

| | | | |
|---|---|---|---|
| 3,579,161 | 5/1971 | Kremzner et al. | 310/156 |
| 5,148,070 | 9/1992 | Frye et al. | 310/168 |
| 5,304,882 | 4/1994 | Lipo et al. | 310/156 |
| 5,371,426 | 12/1994 | Nagate et al. | 310/156 |
| 5,459,385 | 10/1995 | Lipo et al. | 318/701 |
| 5,489,831 | 2/1996 | Harris et al. | 318/701 |
| 5,866,964 | 2/1999 | Li | 310/198 |
| 5,874,795 | 2/1999 | Sakamoto et al. | 310/156 |

FOREIGN PATENT DOCUMENTS 8-116651  5/1996  Japan ................. H02P 5/00

*Primary Examiner*—Nestor Ramirez
*Assistant Examiner*—B. Mullins
*Attorney, Agent, or Firm*—Frishauf, Holtz, Goodman, Langer & Chick, P.C.

[57] ABSTRACT

A three-phase reluctance motor includes, a stator having a plurality of magnetic poles around which coils corresponding to three phases are wound, a rotatable rotor having a plurality of convex poles opposed to the magnetic poles of the stator, a magnet provided on the rotor for magnetizing alternately the convex poles to N- and S-polarities in a circumferential direction, and a control circuit for magnetically exciting selectively only two of the three phases to the N- and S-polarities, respectively, and for sequentially switching two phases which are to be excited, to thereby rotate drive the rotor.

12 Claims, 9 Drawing Sheets

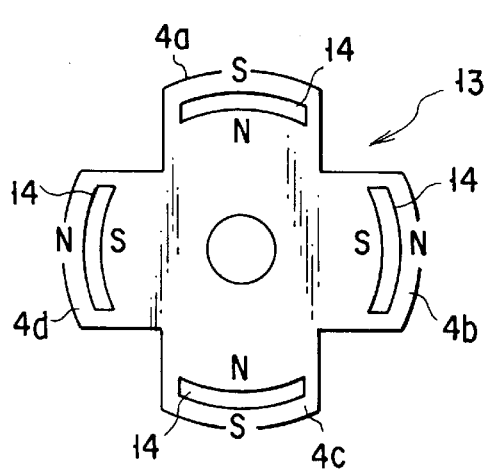
FIG. 4
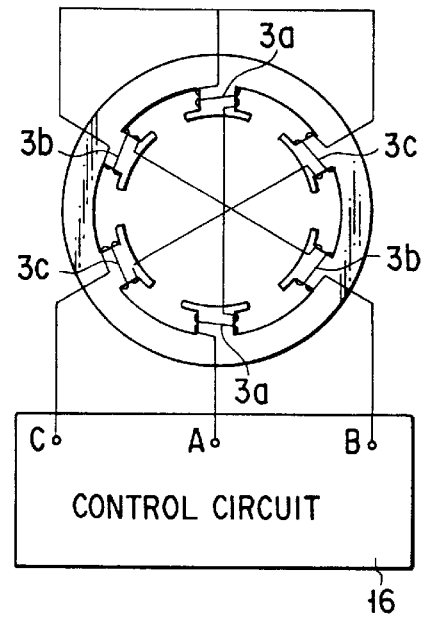
FIG. 5
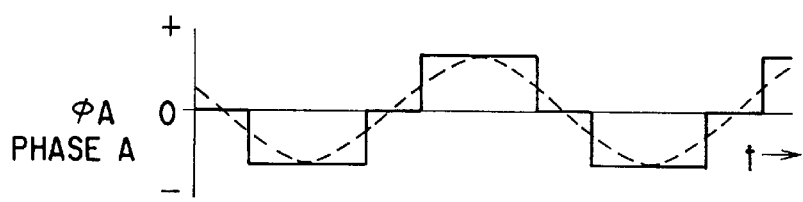
FIG. 6A  $\phi A$ PHASE A
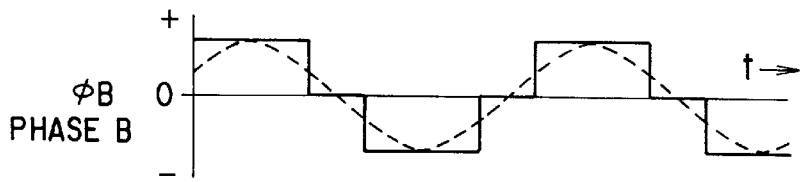
FIG. 6B  $\phi B$ PHASE B
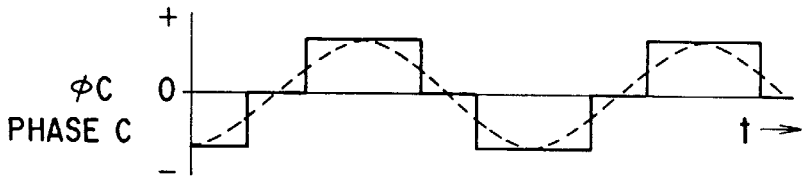
FIG. 6C  $\phi C$ PHASE C

THREE-PHRASE RELUCTANCE MOTOR

BACKGROUND OF THE INVENTION

The present invention relates to a three-phase reluctance motor comprising a rotor having a plurality of convex poles.

A three-phase motor particularly of a variable reluctance type as disclosed in Japanese Patent Application KOKAI Publication No. 8-116651 have been conventionally known. This motor includes a stator having six poles and a rotor made of a soft magnetic material and having four convex poles. Coils of phases A, B, C, A, B, and C are concentrically wound about the six poles located at an equal pitch along the circumferential direction of the stator, respectively. This motor is constructed in a structure in which each pair of magnetic poles shifted by 180° from each other and opposing to each other with the rotor 2 interposed therebetween are of one same phase and two coils of each pair of magnetic poles form a coil of one phase by serially connecting the coils with each other.

In the structure as described above, four of six magnetic poles are selectively excited by applying a current to two of three phase phases, and the four magnetic poles thus excited are shifted along the circumferential direction at predetermined timings of switching the current to attract teeth of the rotor and rotate the rotor in a predetermined direction.

This reluctance type motor is a motor using a principle that the rotation torque acts in such a direction in which the reluctance (or magnetic resistance) between the stator and the rotor is minimized. The motor also adopts another principle that the torque generated becomes larger as the change of the reluctance per unit rotation angle is larger and as the magnetomotive force generated by the coil current between the stator and the rotor is greater. Therefore, a conventional reluctance type motor is arranged such that the width of each magnetic pole of the stator and the width of each convex pole are substantially equal to each other and each arc angle between the convex poles is considerably small as disclosed in U.S. Pat. No. 5,459,385.

However, the reluctance type motor of the structure as described above has a drawback that braking torque is generated in the direction opposite to the rotational direction of the rotor due to a transient phenomenon when switching the current or leakage of magnetic fluxes to magnetic poles not excited and leads to reduction of the efficiency and the output, thereby hindering high speed rotation. Therefore, reluctance type motors are not positively used at present.

BRIEF SUMMARY OF THE INVENTION

The present invention therefore has a main object of providing a three-phase reluctance motor capable of obtaining high torque with a high efficiency so that the rotation speed can be raised to be high.

The present invention has another object of providing a three-phase motor capable of preventing loss of synchronization during high speed rotation so that the high speed rotation can be stabilized.

The present invention has further another object of providing a three-phase motor in which the width of each convex pole of the rotor can be reduced so that the size and weight of the rotor can be reduced.

According to a first aspect of the present invention, there is provided a three-phase reluctance motor comprising: a stator having a plurality of magnetic poles on which coils corresponding to three phases are wound respectively; a rotor rotatable having a plurality of convex poles opposed to the magnetic poles of the stator; a magnet provided on the rotors for magnetizing the convex poles in N- and S-polarities alternately in a circumferential direction; and a control circuit for magnetically exciting selectively only two of the three phases in the N- and S-polarities, respectively, and for sequentially switching two phases which are to be excited, to thereby rotate and drive the rotor.

According to the structure described above, the suction force (i.e., magnetic force of attraction) generated between excited magnetic poles and the convex poles of the rotor can be strengthened, so that high drive torque can be obtained by removing brake torque caused by a suction force from a magnetic pole not excited.

To obtain drive torque more securely, the stator and the rotor are preferably arranged so as to maintain equilibrium in a two-phase excitation state, and are preferably formed such that in the equilibrium, when phases to be excited next are excited to polarities which are different from the polarities of the convex poles of the rotor and phases currently excited are not excited, a suction force between the magnetic poles excited and the convex poles of the rotor is greater than a suction force between the magnetic poles not excited and the convex poles of the rotor.

To achieve this, in the equilibrium, the width of each of the convex poles of the rotor and the width of each of the magnetic poles of the stator may be adjusted such that in the equilibrium, side ends of the convex poles of the rotor in the widthwise direction thereof substantially oppose side ends of magnetic poles of the phases to be excited next in the widthwise direction thereof, respectively. In this case, the side ends of the convex poles of the rotor in the widthwise direction thereof substantially oppose the side ends of magnetic poles of the phases to be excited next in the widthwise direction thereof with a tolerance in the circumferential direction which is four to five times greater than an air gap between the rotor and the stator.

The rotor may be formed by layering I-shaped members in an axial direction of a rotation shaft, each of the I-shaped member provided with a magnet and having an intermediate portion in a lengthwise direction thereof held on a rotation shaft, shifted from each other by a certain angle. The magnets may be embedded at projecting end portions of the convex poles.

In the case described above, when the motor is applied to a pump motor, a space for passing a fluid can be sufficiently maintained between the rotor and the stator, and an advantage can be obtained in that rotor blades and fluid passages can be formed with an improved degree of freedom.

According to a second aspect of the invention, there is provided a three-phase reluctance motor depending on the first aspect in which the stator has six magnetic poles, the rotor has four convex poles, the control circuit has a signal generator circuit for generating a rotational position detection signal by detecting a rotational position of the convex pole rotor for every 30°, and the convex pole rotor is rotated and driven by sequentially performing excitation phase switching by a logical product output obtained by multiplying a speed instruction pulse for controlling the rotation speed and the rotational position detection signal from the signal generator means.

According to the structure described above, switching of two-phase excitation can always be performed at set rotational positions. It is therefore advantageous in that loss of synchronization can be prevented so that stable high speed rotation is maintained.

To prevent loss of synchronization more securely in the structure described above, a timing adjuster circuit is preferably provided for adjusting the timing of the rotational position detection signal generated by the signal generator circuit in accordance with the rotation signal, and the convex pole rotor is preferably rotated and driven by sequentially performing the excitation phase switching by the logical product output obtained by multiplying the rotational position detection signal by the speed instruction pulse.

According to a third aspect of the present invention, there is provided a three-phase reluctance motor of the first aspect in which the stator has twelve magnetic poles, the rotor has eight convex poles, the control circuit has a signal generator circuit for generating a rotational position detection signal by detecting a rotational position of the convex pole rotor for every 15°, and the convex pole rotor is rotated and driven by sequentially performing excitation phase switching by a logical product output obtained by multiplying a speed instruction pulse for controlling the rotation speed by the rotational position detection signal from the signal generator means.

According to the structure described above, the same advantage as obtained in the second aspect can be obtained in a three-phase reluctance motor having a different number of poles.

According to a fourth aspect of the present invention, there is provided a three-phase reluctance motor of the first aspect in which the stator has six magnetic poles, the rotor has four convex poles, and an angle between the convex poles of the N-polarity and the convex pole of the S-polarity is set within a range of 60° to 76°.

By thus setting the angle between the convex poles of the N-polarity and the convex pole of the S-polarity within a range of 60° to 76°, high torque can be obtained like in the case of the second aspect even if the width of each convex pole of the convex pole rotor is reduced to be small.

In this case, the displacement angle at which the torque peak value is obtained is smaller than that in the second aspect (e.g., the displacement angle in this aspect is 45° in comparison with the second aspect in which the displacement angle is 60°). In addition, since the width of each convex pole of the rotor can be reduced to be small, the size and weight of the rotor can be reduced so that the size and weight of the motor can be reduced. Accordingly, high speed operation is enabled by the motor having the small size and light weight.

According to a fifth aspect of the present invention, there is provided a three-phase reluctance motor of the first aspect in which the stator has twelve magnetic poles, the rotor has eight convex poles, and an angle between the convex poles of the N-polarity and the convex pole of the S-polarity is set within a range of 30° to 38°.

According to the structure described above, the same advantage as obtained in the fourth aspect can be obtained in a three-phase reluctance motor having a different number of poles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a plan view showing a rotor of another embodiment;

FIG. 5 is a view showing connections of coils provided on the stator;

FIGS. 6A to 6C are waveform charts showing changes of excitation voltages;

DETAILED DESCRIPTION OF THE INVENTION

Embodiments of the present invention will be explained below with reference to the drawings.

[First Embodiment]

[Basic Structure]

Figure 1:
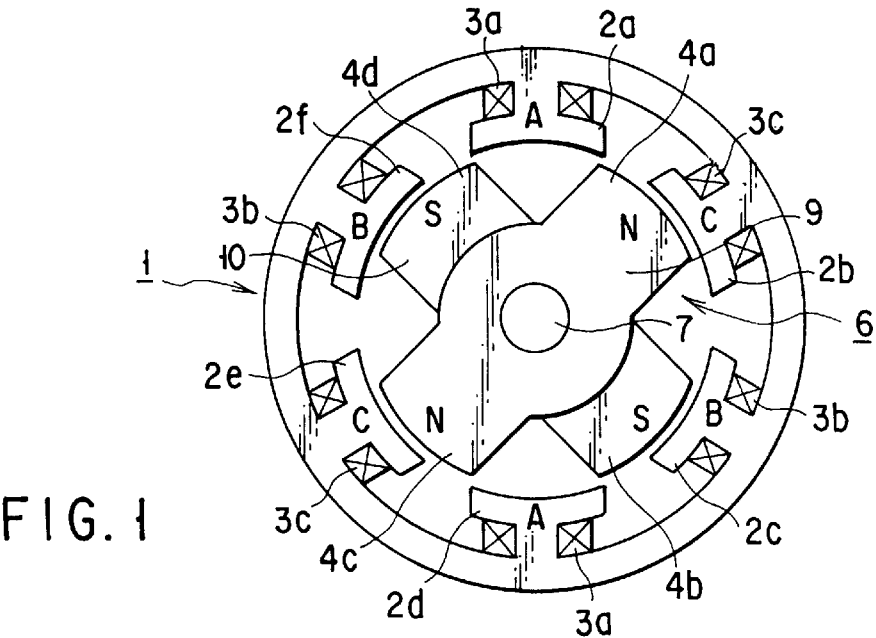
FIG. 1 is a plan view schematically showing the structure of a three-phase motor according to an embodiment of the present invention.

FIG. 1 schematically shows the plane structure of a three-phase motor according to the present embodiment.

In FIG. 1, the reference 1 denotes a stator. The stator 1 has six magnetic poles 2a to 2f, and coils 3a to 3c of phases A, B, C, A, B, and C are concentrically wound around the magnetic poles 2a to 2f, respectively. Further, a convex rotor 6 having four convex magnetic poles 4a to 4d is rotatably attached on a rotation shaft 7.

Figure 2:
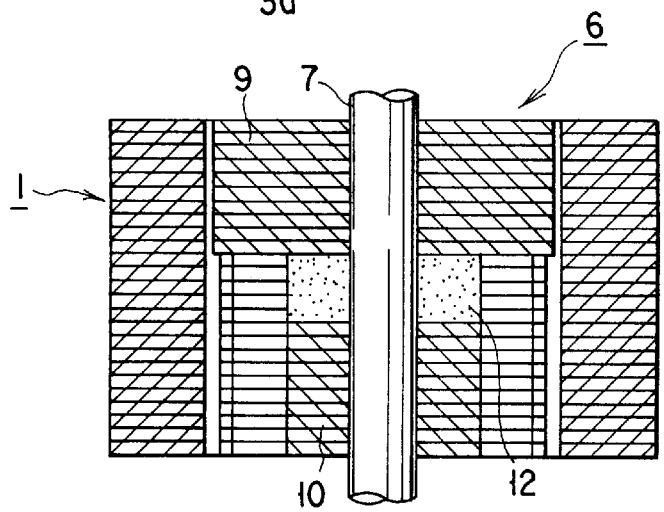
FIG. 2 is a longitudinal cross-sectional view showing a stator and a rotor.
Figure 3:
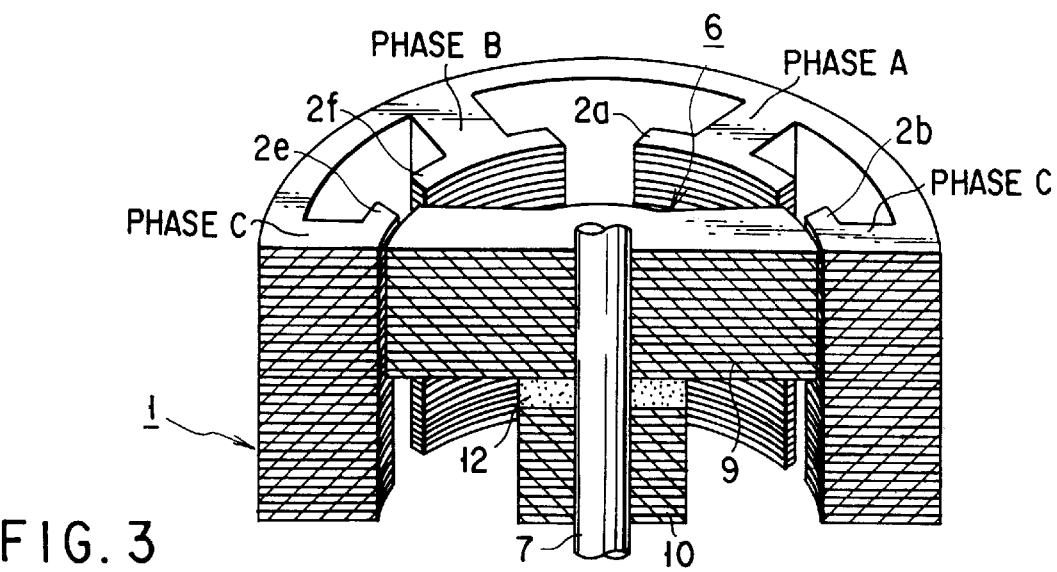
FIG. 3 is a perspective view including a partial longitudinal cross-sectional view showing the stator and the rotor.

The convex pole rotor 6 is constructed in a structure in which a pair of I-shaped layer cores 9 and 10 are layered vertically and are shifted by 90° from each other so as to form a cross-like shape as shown in FIG. 1. As shown in FIGS. 2 and 3, a magnet 12 made of rare earth material such as a circular samarium-cobalt magnet magnetized in the axial direction of the rotation shaft 7 is inserted between the cores 9 and 10, and convex poles 4a and 4c of N-polarity are formed by the I-shaped core 9 while convex poles 4b and 4d of S-polarity are formed by the other I-shaped core 10.

Note that the convex-pole motor may use a core 13 previously formed in a cross-like shape. In this case, for example, slit-like holes are opened in outer end portions of the convex poles 4a to 4d, and plastic magnets 14 made of naodium-boron or the like may respectively be inserted in the holes and magnetized in N-, S-, N-, and S-polarities in this order in the circumferential direction.

To summarize, it suffices that the rotor is constructed by locating convex poles 4a to 4d with a predetermined clearance maintained between each other so that a change of reluctance is created in the circumferential direction and so that the convex poles 4a to 4d are magnetized in N-, S-, N-, and N-polarities in this order by permanent magnets.

The coils 3a to 3c of phases A, B, and C of the three-phase motor are connected in form of Y-shape and are subjected to two-phase excitation control in accordance with a sequence shown in Table 1 by a control circuit 16. The order of exciting the phases is related to the rotation direction of the motor, and the motor can be rotated inversely by reversing the order of excitation.

TABLE 1

| Phase | Step 0 | 1 | 2 | 3 | 4 | 5 | 6 |
|---|---|---|---|---|---|---|---|
| φA | — | S | S | — | N | N | — |
| φB | N | N | — | S | S | — | N |
| φC | S | — | N | N | — | S | S |

The excitation sequence shown in FIG. 1 will be expressed in form of waveform charts, e.g., rectangular wave voltages indicated by waveforms of continuous line in FIGS. 6A to 6C. The explanation below will be made of a case where high torque is obtained by excitation phase switching depending on the rectangular wave voltages. Note that similar effects and advantages are obtained if the excitation phase switching is performed depending on three-phase alternating current waveform voltages as basic waveforms of rectangular waves.

Figure 7:
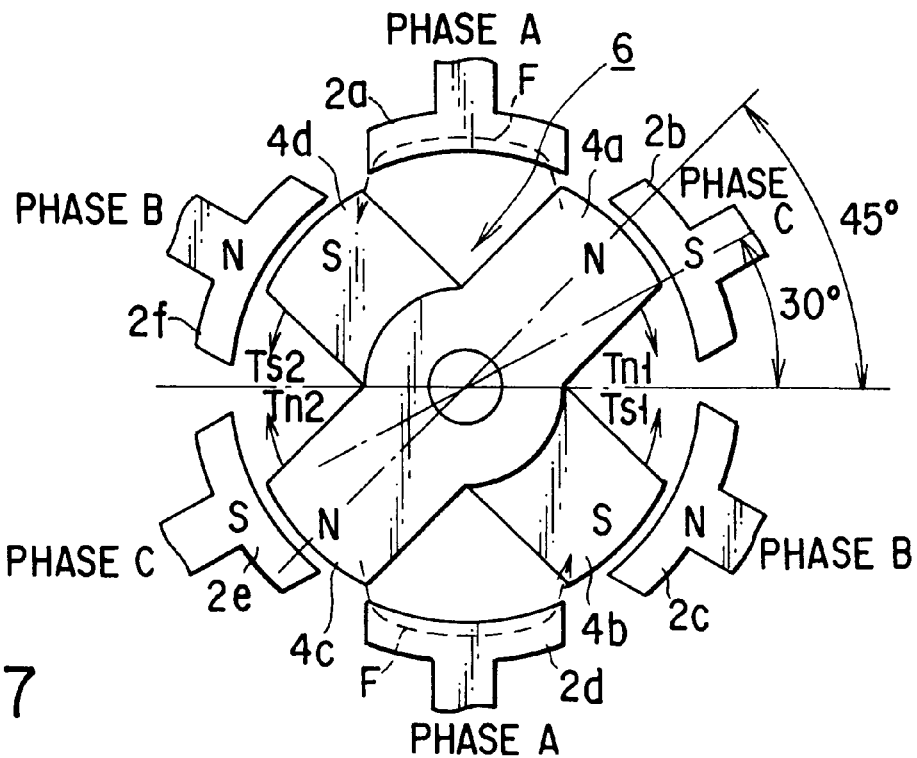
FIG. 7 is a view for explaining equilibrium between the rotor and the stator.

FIG. 7 shows equilibrium of the convex rotor 6 in case of two-phase excitation where the phase A is not magnetically excited, the phase B is excited in N-polarity, and the phase C is excited in S-polarity. This is a state in the step 0 or 6 in Table 1. In the convex-pole rotor 6, torque forces Tn1 and Tn2 are respectively generated in the clockwise direction at convex N-poles 4a and 4c, and torque forces Ts1 And Ts2 balanced with the Tn1 and Tn1 are generated in the anti-clockwise direction at convex S-poles 4b and 4d, thus maintaining the equilibrium.

Figure 8:
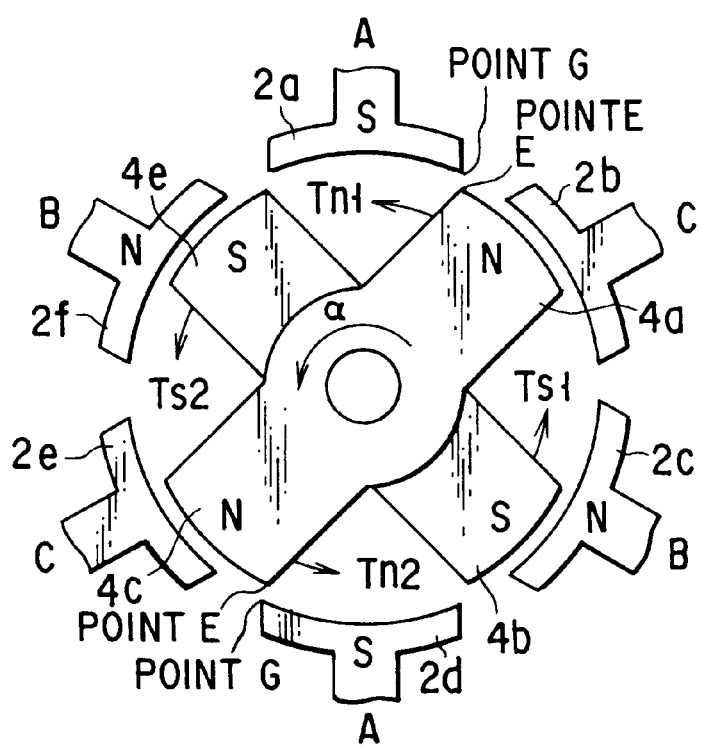
FIG. 8 is a view for explaining torque generated when excitation phases are switched by one step from the equilibrium shown in FIG. 7.

In this motor, as shown in FIG. 8, the width of each of the magnetic poles 2a to 2f and the width the motor are arranged appropriately such that side ends (or points E) of the convex pole rotor 6 substantially oppose to side ends (or points G) of the magnetic poles 2a and 2d of A-phase to be excited next to the stator 1 in this equilibrium. In this structure, the suction force (i.e., magnetic force of attraction) between the magnetic poles 2a and 2d of the phase A to be excited next and the convex N-poles 4a and 4c become greater than the suction force between the magnetic poles 2b and 2e of the phase C not excited and the convex N-poles 4a and 4c, when the magnetic poles 2a and 2d of the phase A to be excited next are excited in S-polarity opposite to the convex N-poles of the convex pole rotor 6 and the magnetic poles 2b and 2e of the phase C currently excited are not excited. As a result of this, the rotor 6 is driven in the direction indicated by the arrow α.

Specifically, a range of ±ag×(4 to 5) is preferable where ag is the air gap between the stator 1 (or the magnetic poles thereof) and the rotor 6 (or the magnetic poles thereof) and where the position at which the positions of the side end points E and G in the circumferential direction perfectly correspond to each other is ±0. Accordingly, it may fall in the range of ±1 mm where the air gap is 0.2 mm. That is, the convex poles 4a and 4c may be deviated by about 1 mm to the inside of the magnetic poles 2a and 2d and/or the convex poles 4a and 4c may be deviated by about 1 mm to the outside of the magnetic poles 2a and 2d.

Where the convex poles 4a and 4c are deviated to the inside of the magnetic poles 2a and 2d, it is important that loss of the magnetic excitation force due to a leakage magnetic flux extending from the convex N-pole 4a (or 4c) through the A-phase magnetic pole 2a (or 2d) to the convex S-pole 4d (or 4b) is reduced to be negligibly small by the magnetic pole 2a (or 2d) of the phase A. The width of each of the magnetic poles 2a to 2f of the stator and the width of each of the convex poles 4a to 4d need to be thus arranged.

Although the relationship between the stator 1 and the magnetic poles 2a and 2d of the phase A has been explained above, the same relationship as described above applies to the relationships between the stator and the magnetic poles 2b and 2e of the phase B and between the stator and the magnetic poles 2c and 2f of the phase C.

In the equilibrium shown in FIG. 7, the state of two-phase excitation is switched to the state of the step 1 in Table 1 in which the phase B is kept in N-polarity, the phase A is kept in S-polarity, and the phase C is not excited. Then, as shown in FIG. 8, directions of the torque forces Tn1 and Tn2 generated at the convex N-poles 4a and 4c of the convex pole rotor 6 are reversed so that torque which rotates the convex pole rotor 6 in the anti-clockwise direction is generated. In this time, the largest torque is generated near the point E. If the convex pole rotor 6 is thus rotated nearly to 30°, the directions of the torque forces Ts1 And Ts2 Generated at the S-poles 4b and 4d of the convex pole rotor 6 are reversed so that the torque forces Ts1 And Ts2 Have the same strength as the torque forces Tn1 and Tn2 generated at the convex N-poles 4a and 4d, in directions opposite to each other. The convex pole rotor 6 has thus come to maintain equilibrium again.

Figure 9:
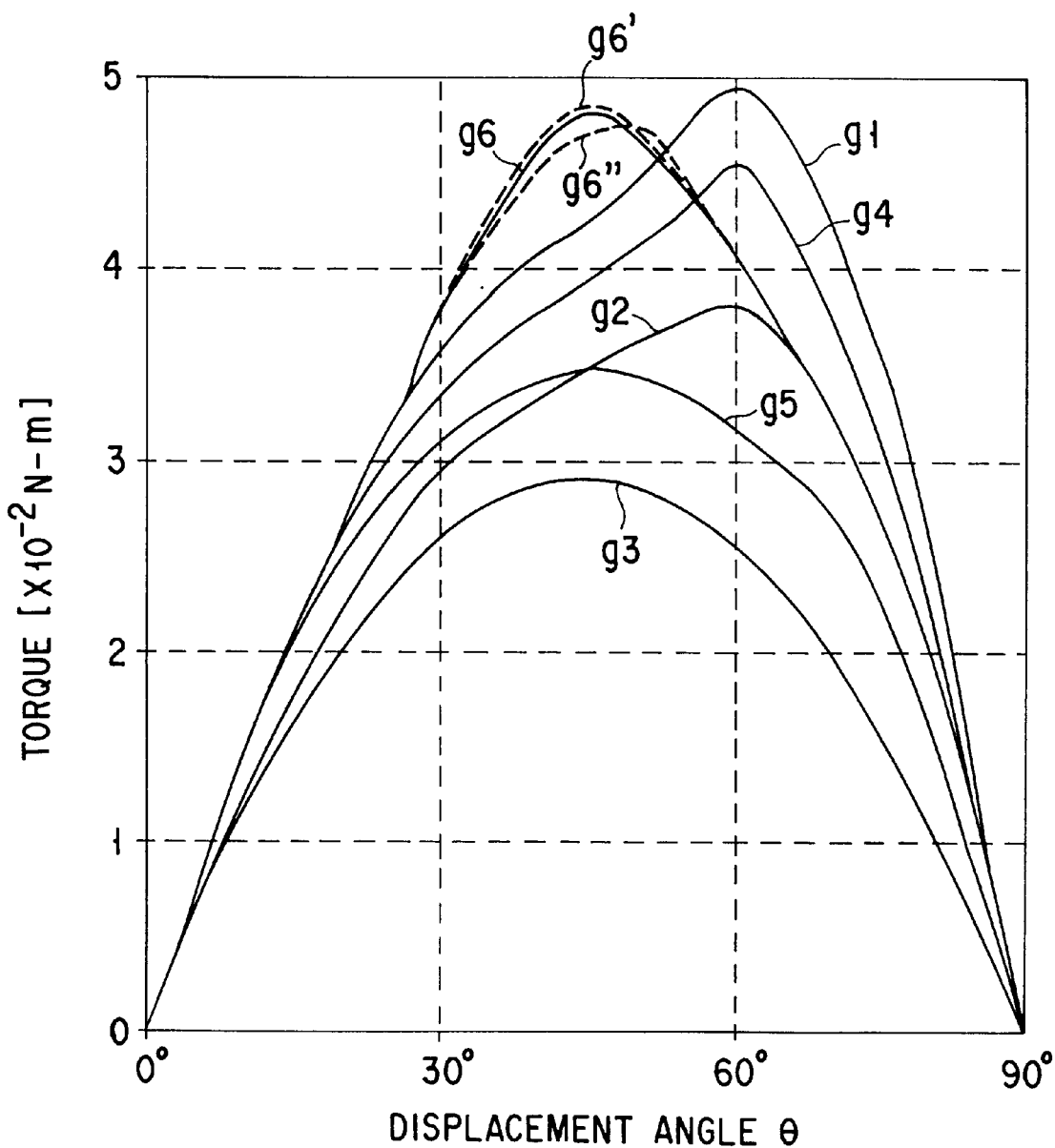
FIG. 9 is a graph showing a stiffness characteristic where the widths of the magnetic poles of the stator and the convex poles of the rotor are changed.

The relationship between generated torque and an angle or displacement angle θ to a next equilibrium point from an equilibrium point where the convex pole rotor 6 is kept in equilibrium is called a stiffness characteristic which will be shown in the graph g1 in FIG. 9 in case of this motor. As can be seen from the graph, high torque is obtained as a whole and the highest torque is obtained when the displacement angle θ is 60°.

FIGS. 10A to 10D are views showing the positionally relationships between the stator 1 and the convex pole rotor 6 in accordance with rotation of the motor in the clockwise direction.

Figure 10A:
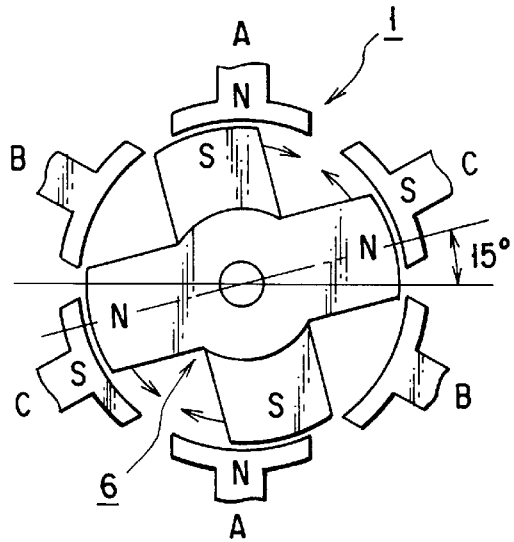
FIGS. 10A to 10D are views showing steps of rotation operation of the three-phase motor based on the embodiment.
Figure 10B:
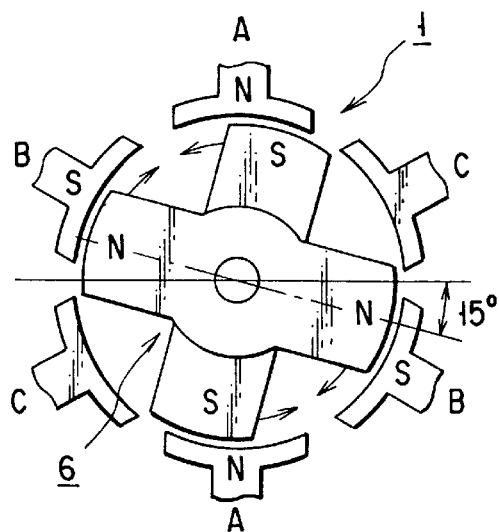
Figure 10C:
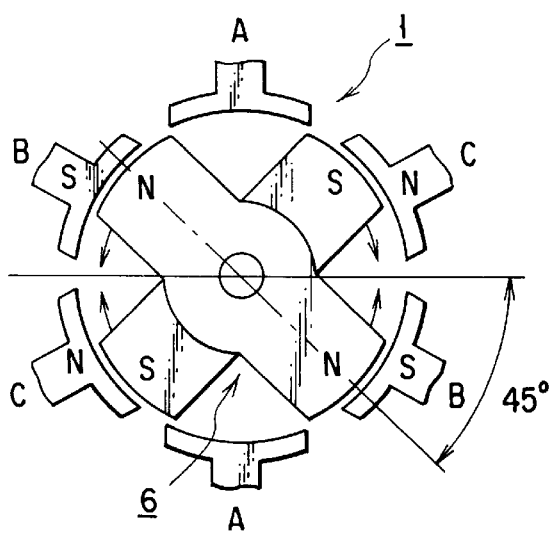
Figure 10D:
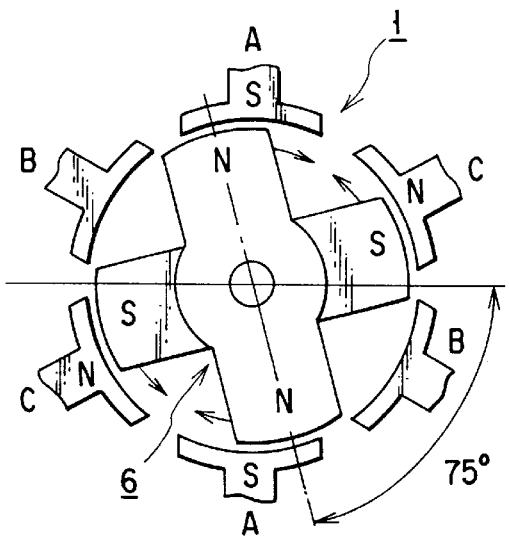

FIG. 10A shows equilibrium between the stator 1 and the convex pole rotor 6 in the two-phase excitation state in the step 5 in Table 1. That is, the phases A and C of the stator 1 are respectively excited in N- and S-polarities while the phase B is not excited.

In this state, the excited phases are switched from the step 5 to the step 4, i.e., the phase B is switched in S-polarity and the phase C is not excited with the N-polarity of the phase A kept unchanged. Then, the convex pole rotor 6 rotates by 30° in the clockwise direction to a next equilibrium point.

Further, the excited phases are switched from the step 4 to the step 3, i.e., the phase C is switched to N-polarity and the phase A is switched to a non-excited phase with the S-polarity of the phase B kept unchanged. Then, the convex pole rotor 6 further rotates by 30° to a next equilibrium point.

Further, the excited phases are switched from the step 3 to the step 2, i.e., the phase A is switched to S-polarity and the phase B is switched to a non-excited phase with the N-polarity of the phase C kept unchanged.

By repeating sequentially excitation switching from the step 5 to the step 0 in this manner, the convex pole rotor 6 rotates in the clockwise direction. Inversely, by repeating sequentially excitation switching from the step 0 to the step 5, the convex pole rotor 6 rotates in the anti-clockwise direction.

According to the three-phase reluctance motor constructed as described above, the following advantages can be obtained.

Firstly, according to the three-phase reluctance motor, it is possible to strengthen the suction force between the convex poles 4a to 4d and the excited ones of the magnetic poles 2a to 2f since the rotor 6 is provided with a magnet 12 in a switching reluctance type motor which drives the rotor 6 by utilizing a difference between the magnetic resistance of the convex poles 4a to 4d and the magnetic resistance of the spaces between the convex poles.

As a result of this, there is an advantage that high drive torque can be obtained.

Secondly, in this motor, the width of each of the convex poles 4a to 4d is arranged so that side end portions of the convex poles 4a to 4d of the convex rotor 6 are respectively positioned near and substantially oppose to side end portions of those of magnetic poles 2a to 2f which are to be excited next to the stator 1.

As a result of this, much higher torque can be obtained advantageously. That is, those ones of the magnetic poles 2a to 2f that are to be excited next are located close to the convex poles 4a to 4d of the rotor 6, so that the suction force generated when those of the magnetic poles 2a to 2f which are to be excited next are set in the polarity different from that of the convex poles 4a to 4d of the rotor 6 is greater than the suction force generated by the magnetic poles currently opposing. Therefore, high torque can be obtained efficiently and the rotation speed can be increased.

Where side end positions of the magnetic poles of the stator 1 oppose to side end portions of the convex pole rotor 6, the range of the opposition and layering of the side end portions is set such that a reduction of the magnet excitation force caused by a leakage flux due to the opposing and layering of the side end portions is negligibly small. In this manner, high torque can be obtained more efficiently.

Thirdly, the rotor 6 used is a rotor formed by inserting and layering a magnet 12 between a pair of I-shaped layered cores 9 and 10 in form of a cross-like shape or a rotor formed by using a cross-shaped core 13 having magnets 14 embedded in the convex pole portions. Therefore, magnets are capable of sufficiently withstand the centrifugal force generated during high speed rotation. For example, the rotor responds to high speed rotation at 50,000 rpm or more. In this respect, the rotation speed can also advantageously be increased.

[Comparison of the Stiffness Characteristic where the Widths of Magnetic Poles and Convex Poles are Changed]

Next, explanation will be made of a stiffness characteristic where the width of each of the magnetic poles 2a to 2f of the stator 1 and the width of each of the convex poles 4a to 4d are changed.

Figure 11:
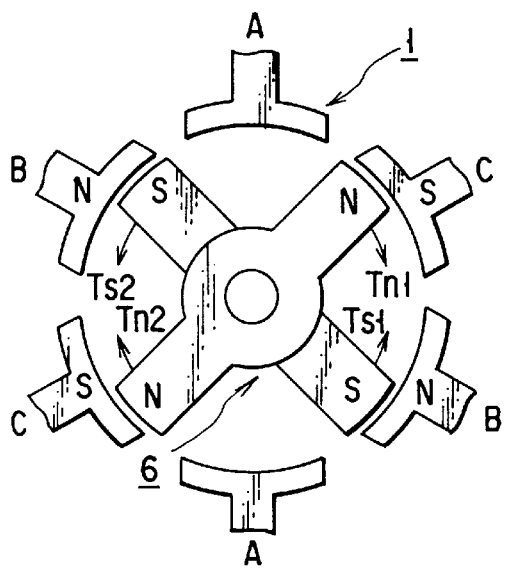
FIG. 11 is a view showing equilibrium of the rotor under an excitation condition when the width of each convex pole of the rotor is smaller than that in an embodiment.
Figure 12:
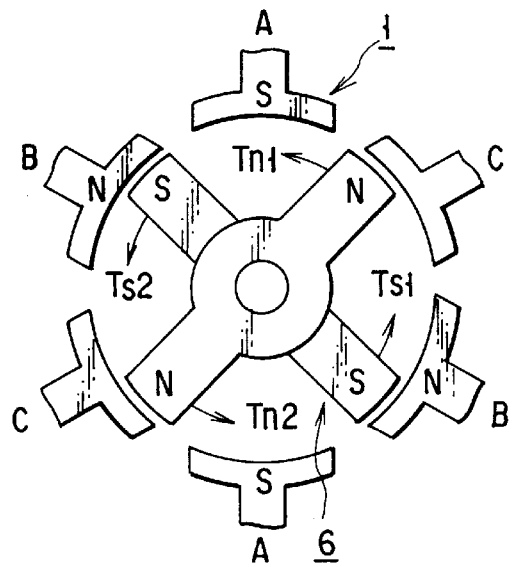
FIG. 12 is a view for explaining generated torque when excited phases are switched by one step from the equilibrium shown in FIG. 11.

FIGS. 11 and 12 show states in which the width of each of the convex poles 4a to 4d is reduced with the width of each of the magnetic poles 2a to 2f set to a proper width. FIG. 11 shows equilibrium and directions of torque forces Tn1, Ts2, Tn2, and Ts2 when the phase B of the stator 1 is excited in N-polarity and the phase C thereof is excited in S-polarity with the phase A thereof not excited. FIG. 12 shows torque forces when the phase A is switched to S-polarity from the equilibrium and the phase C is not excited with the N-polarity of the phase B kept unchanged.

By thus switching the phases, the directions of the torque forces Tn1 and Tn2 generated at the convex N-poles of the convex rotor 6 are reversed to rotate the convex pole rotor 6 in the anti-clockwise direction. However, the convex N-poles of the convex pole rotor 6 and the S-poles of the A-phases of the stator 1 are so distant from each other that the suction force therebetween is very small. Besides, torque forces in directions opposite to each other are generated between the convex poles in N-polarity and the magnetic poles of the phase C of the stator 1, so that the torque forces Tn1 and Tn2 generated at convex poles of the N-poles become very close to zero. Therefore, torque which contributes to rotation is reduced. In this case, the stiffness characteristic of the motor is as shown in the graph in FIG. 9.

Figure 13:
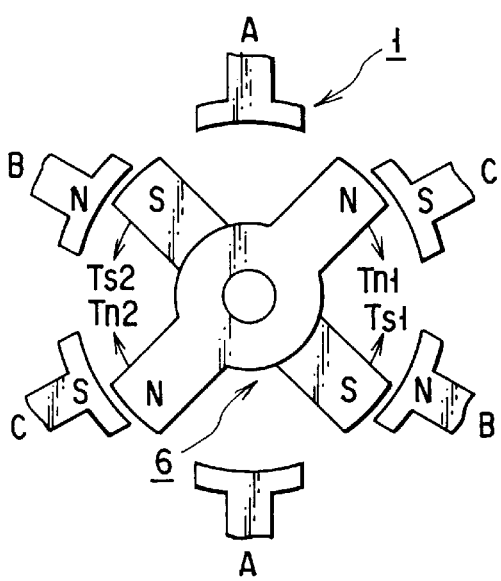
FIG. 13 is a view showing equilibrium of the rotor under an excitation condition when the width of each magnetic pole of the stator and the width of each convex pole of the rotor are smaller than those in an embodiment.
Figure 14:
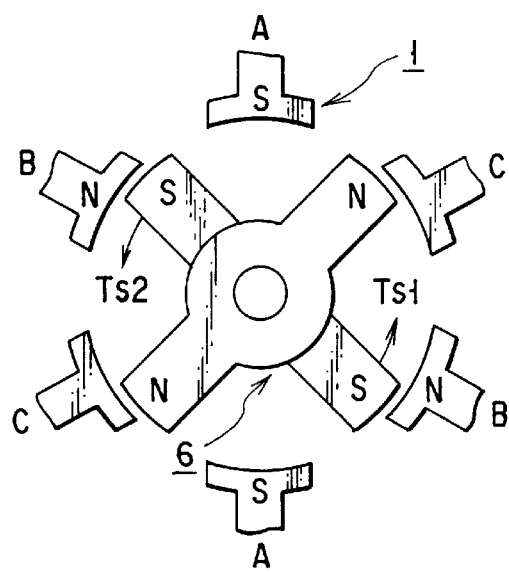
FIG. 14 is a view for explaining generated torque when excited phases are switched by one step from the equilibrium shown in FIG. 13.

FIGS. 13 and 14 show a case where both the width of each of the convex poles of the convex rotor 6 and the width of each of the magnetic poles of the stator 1 are reduced. FIG. 13 shows equilibrium and directions of torque forces Tn1, Ts1, Tn2, and Ts2 generated when the phase B of the stator 1 are excited in N-polarity and the phase C thereof is excited in S-polarity with the phase A not excited. FIG. 14 shows torque forces generated when the phase A is switched to S-polarity from the equilibrium and the phase C is not excited with the N-polarity of the phase B kept unchanged.

By thus switching the phases, backward torque forces acting so as to move back the rotation are generated at the N-poles of the convex rotor 6 so that torque forces Ts1 and Ts2 generated at the convex poles in S-polarity are reduced. Accordingly, the torque which contributes to rotation becomes much smaller. In case of this motor, the stiffness characteristic is shown in the graph g3 in FIG. 9.

Figure 15:
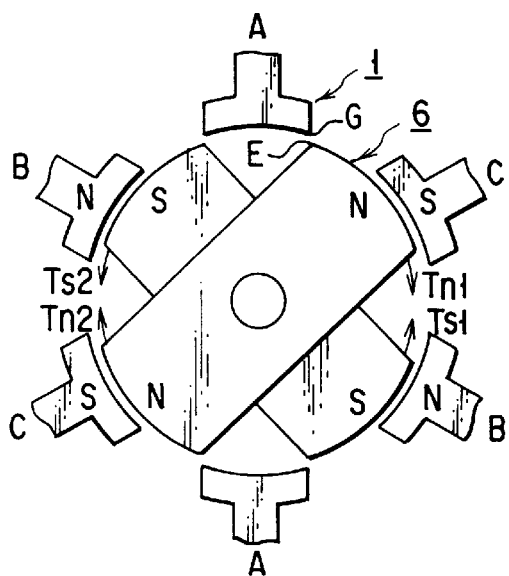
FIG. 15 is a view showing equilibrium of the rotor under an excitation condition when the width of each magnetic pole of the stator is smaller and the width of each convex pole of the rotor is larger than those in an embodiment.
Figure 16:
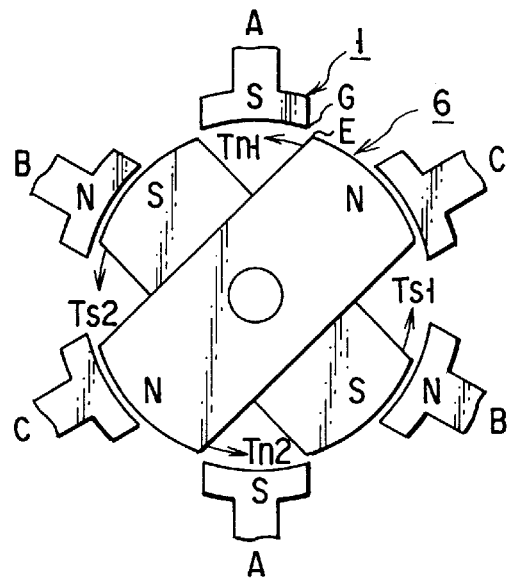
FIG. 16 is a view for explaining generated torque when excited phases are switched by one step from the equilibrium shown in FIG. 15.

FIGS. 15 and 16 show a case where the width of each of the convex poles of the convex rotor 6 is enlarged and the width of each of the magnetic poles of the stator 1 is reduced. FIG. 15 shows equilibrium and directions of generated torque forces Tn1, Ts1, Tn2, and Ts2 when the phase B of the stator 1 is excited in N-polarity and the phase C thereof is excited in S-polarity with the phase A not excited. FIG. 16 shows torque forces generated when the phase A is switched to S-polarity from the equilibrium and the phase C is not excited with the N-polarity of the phase B kept unchanged.

By thus switching the phases, the directions of the torque forces Tn1 and Tn2 generated at the convex poles of the N-poles of the convex rotor 6 are reversed so that the convex pole rotor 6 rotates in the anti-clockwise direction. In this case, the torque forces Tn1 and Tn2 generated between the convex N-poles of the convex pole rotor 6 and the magnetic S-poles of the phase A of the stator 1 are so large that the convex pole rotor 6 rotates with high torque. In case of this motor, the stiffness characteristic approximates to the stiffness characteristic of the graph g1.

Figure 17:
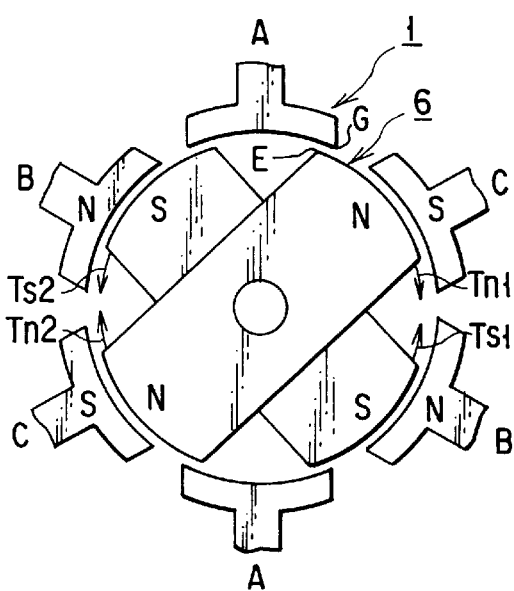
FIG. 17 is a view showing equilibrium of the rotor under an excitation condition when the width of each magnetic pole of the stator is set to a proper width and the width of each convex pole of the rotor is larger than that in an embodiment.
Figure 18:
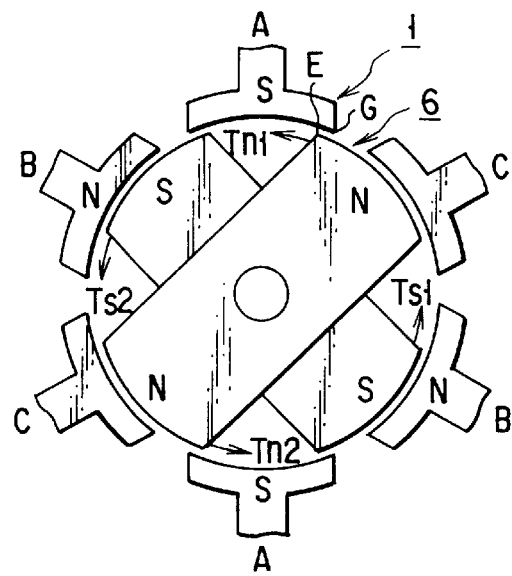
FIG. 18 is a view for explaining generated torque when excited phases are switched by one step from the equilibrium shown in FIG. 17.

FIGS. 17 and 18 show a case where the width of each of the convex poles of the convex rotor 6 are enlarged with the width of each of the magnetic poles of the stator 1 set to a proper width. FIG. 17 shows equilibrium and directions of torque forces Tn1, Ts1, Tn2, and Ts2 generated when the phase B of the stator 1 is excited in N-polarity and the phase C thereof is excited in S-polarity with the phase A not excited. FIG. 18 shows torque forces generated when the phase A is switched to S-polarity from the equilibrium and the phase C is not excited with the N-polarity of the phase B kept unchanged.

By thus switching the phases, the directions of the torque forces Tn1 and Tn2 generated at the convex poles of the N-poles of the convex rotor 6 are reversed. However, high torque cannot be obtained as a whole. In case of this motor, the stiffness characteristic is expressed as a curve which approximates to the graph g4 in FIG. 9 and has a relatively low peak value.

Figure 19:
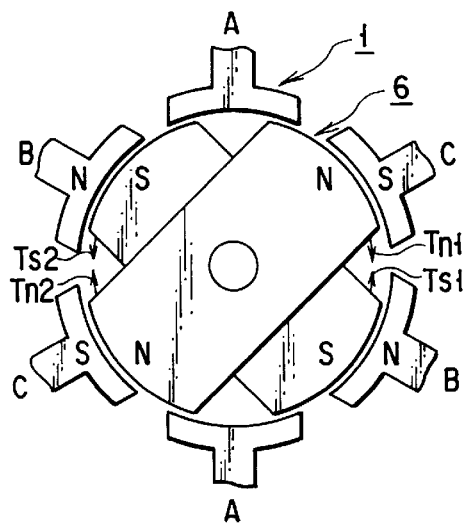
FIG. 19 is a view showing equilibrium of the rotor under an excitation condition when the width of each magnetic pole of the stator is set to a proper width and the width of each convex pole of the rotor is especially large compared with an embodiment.
Figure 20:
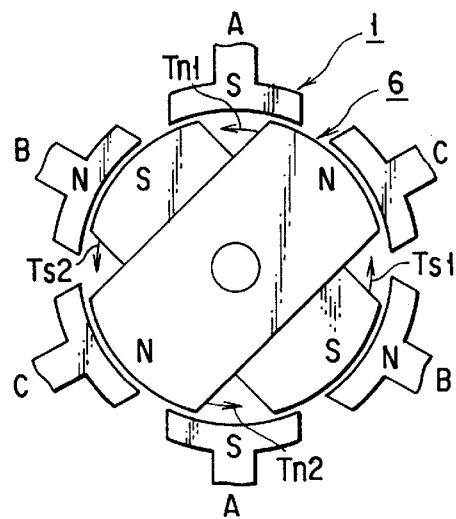
FIG. 20 is a view for explaining generated torque when excited phases are switched by one step from the equilibrium shown in FIG. 19.

FIGS. 19 and 20 show a case where the width of each of the convex poles of the convex rotor 6 is much more enlarged with the width of each of the magnetic poles of the stator 1 set to a proper width. FIG. 19 shows equilibrium and directions of torque forces Tn1, Ts1, Tn2, and Ts2 generated when the phase B of the stator 1 is excited in N-polarity and the phase C thereof is excited in S-polarity with the phase A not excited. FIG. 20 shows torque forces generated when the phase A is switched to S-polarity from the equilibrium and the phase C is not excited with the N-polarity of the phase B kept unchanged.

By thus switching the phases, the directions of the torque forces Tn1 and Tn2 generated at the convex poles of the N-poles of the convex rotor 6 are reversed. However, high torque cannot be obtained as a whole. In case of this motor, the stiffness characteristic is as shown in the graph g5 in FIG. 9.

Among the examples described above, the example shown in FIGS. 15 and 16 is included in the present invention.

Specifically, high torque can be obtained as described above in a manner in which the width of each of the magnetic poles and the width of each of the convex poles are set to proper widths such that side ends (or points E) of the convex pole rotor 6 substantially oppose to side ends (or points G) of those phases of the magnetic poles that are to be excited next to the stator 1.

The example shown in FIGS. 17 and 18 attains high torque and is also included in the present invention when every of the displacements of the points E and the points G falls within a range which is four to five times greater than the air gap between the stator 1 (or the magnetic poles thereof) and the rotor 6 (or the convex poles thereof). Specifically, in case where the air gap is 0.2 mm, every of the displacements must be within a range of ±1 mm. In other words, the convex poles may be deviated by about 1 mm to the inside of the magnetic poles and/or to the outside of the magnetic poles.

Table 2 shows examples of six kinds of motors. In every of the examples, the convex pole rotor 6 has an outer diameter of 41 mm and each of cores of N- and S-polarities has a layer thickness of 8 mm. As for only the pole width, four kinds of pole widths of 22 mm, 18 mm, 14 mm, and 9 mm are used. Also in every of the examples, the stator 1 has an outer diameter of 72 mm and an inner diameter of 42 mm, and the layer thickness of each core is 20 mm. As for only the pole width, two kinds of pole widths of 18 mm and 12 mm are used. Note that each of the magnets 16 has a diameter of 20 mm and a thickness of 2 mm.

TABLE 2

| | No. | | | | | |
|---|---|---|---|---|---|---|
| | 1 | 2 | 3 | 4 | 5 | 6 |
| Rotor | | | | | | |
| Outer diameter (mm) | 41 | 41 | 41 | 41 | 41 | 41 |
| Layered thickness (mm) | 8 × 2 | 8 × 2 | 8 × 2 | 8 × 2 | 8 × 2 | 8 × 2 |
| Pole width (mm) | 22 | 18 | 14 | 9 | 9 | 18 |
| Stator | | | | | | |
| Outer diameter (mm) | 72 | 72 | 72 | 72 | 72 | 72 |
| Inner diameter (mm) | 42 | 42 | 42 | 42 | 42 | 42 |
| Layered thickness (mm) | 20 | 20 | 20 | 20 | 20 | 20 |
| Pole width (mm) | 18 | 18 | 18 | 18 | 12 | 12 |
| Magnet | | | | | | |
| Diameter (mm) | 20 | 20 | 20 | 20 | 20 | 20 |
| Plate thickness (mm) | 2 | 2 | 2 | 2 | 2 | 2 |

The example No. 1 adopts the pole width of 22 mm for the convex pole rotor and the pole width of 18 mm for the stator and corresponds to the motor shown in FIG. 19. The example No. 2 adopts the pole width of 18 mm for the convex pole rotor and the pole width of 18 mm for the stator and corresponds to the motor shown in FIG. 17. The example No. 3 adopts the pole width of 14 mm for the convex pole rotor and the pole width of 18 mm for the stator and corresponds to the motor shown in FIG. 7 which use proper widths. The example No. 1 adopts the pole width of 9 mm for the convex pole rotor and the pole width of 18 mm for the stator and corresponds to the motor shown in FIG. 11. The example No. 5 adopts the pole width of 9 mm for the convex pole rotor and the pole width of 12 mm for the stator and corresponds to the motor shown in FIG. 13. The example No. 6 adopts the pole width of 18 mm for the convex pole rotor and the pole width of 12 mm for the stator and corresponds to the motor shown in FIG. 15.

[Drive Circuit of the Motor]

Next, the drive circuit for driving the motors will be explained below.

Figure 21:
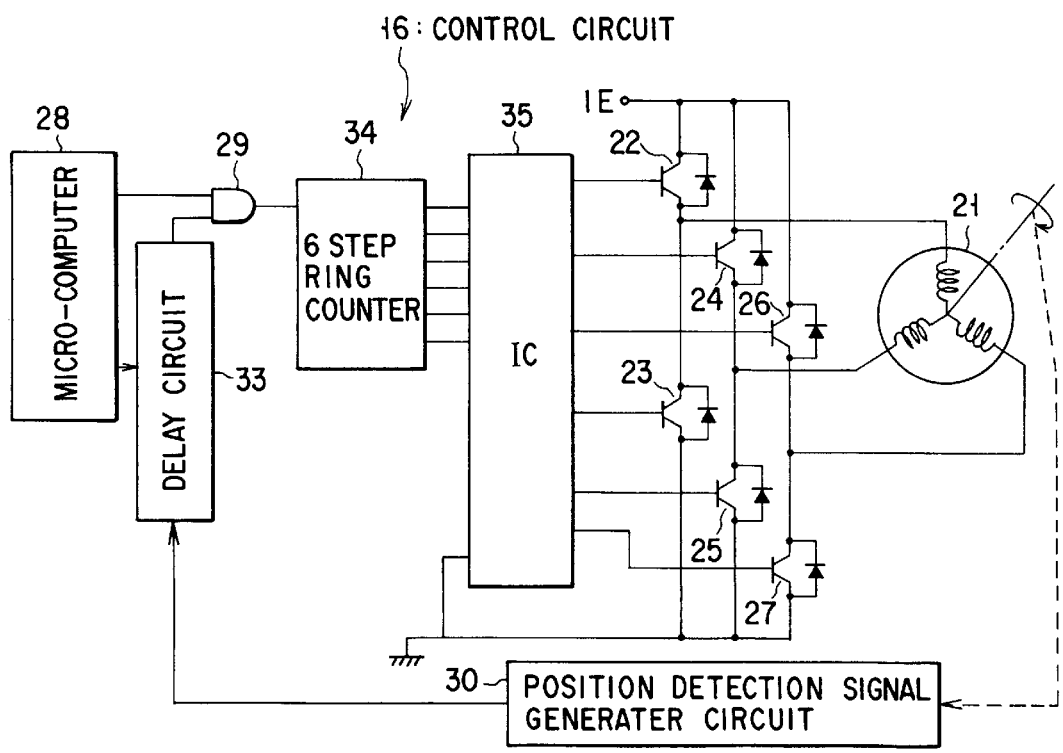
FIG. 21 is a view showing the structure of a motor drive circuit according to the embodiment.

As shown in FIG. 21, a serial circuit of two NPN-type transistors 22 and 23, another serial circuit of two NPN-type transistors 24 and 25, and further another serial circuit of two NPN-type transistors 26 and 27 are connected between a +E terminal and a ground. Coils of different phases of the motor 21 are respectively connected to a connection point between the transistors 22 and 23, a connection point between the transistors 24 and 25, and a connection point between the transistors 26 and 27.

A speed instruction pulse for controlling the rotation speed is inputted from a micro-computer 28 to a two-input AND gate circuit 29. The rotational position of the motor 21 is detected by a position detection signal generator circuit 30 as a means for generating a signal.

Figure 22:
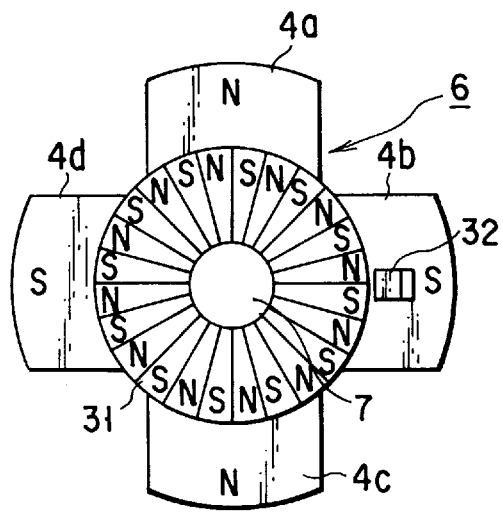
FIG. 22 is a plan view showing a mechanical portion for detecting a rotational position, based on an embodiment of the present invention.
Figure 23:
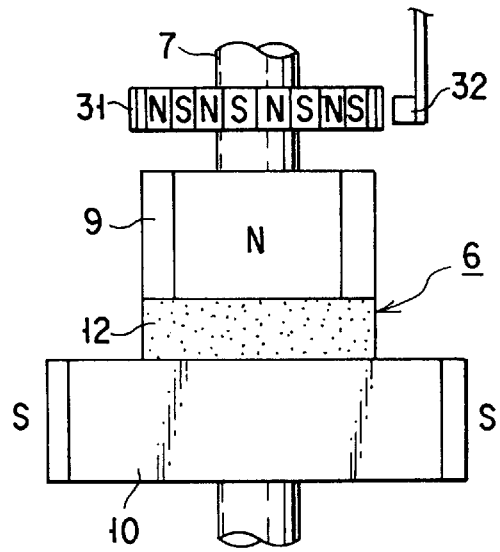
FIG. 23 is a side view also showing a mechanical portion for detecting a rotational position.

The position detection signal generator circuit 30, is constructed such that a disk-like 24-pole magnet 31 is fixed to a rotation shaft 7 supporting a convex pole rotor 6 and is located above the rotor 6, as shown in FIGS. 22 and 23, and a hole element 32 detects each of the magnetic poles of the magnet 31 passing through. For example, in case where a pulse signal is generated every time a N-pole passes, the pulse signal from the hole element 32 is generated every time the convex pole rotor 6 is rotated by 30°. Further, the pulse signal is subjected to wave-shaping and is supplied as a position detection signal to a delay circuit 33.

The delay circuit 33 delays and controls the position detection signal to adjust the timing at which the position detection signal is supplied to the AND gate circuit 29. The delay amount is controlled in accordance with load conditions and acceleration conditions by the micro-computer 28.

The AND gate circuit 29 obtains a logical product obtained by multiplying the speed instruction pulse from the micro-computer 28 by the position detection signal from the delay circuit 33, and outputs the logical product to a step ring counter 34. The ring counter 34 sequentially changes outputs to six output lines in accordance with the input of the logical product from the AND gate circuit 29 from the ring counter 34 and repeats this operation. The ring counter 34 supplies its output to an inverter IC 35.

The inverter IC 35 takes in the output from the ring counter 34 and performs switching control on the transistors 22 to 27 such that the motor 21 operates in the order of the steps of two-phase excitation indicated in Table 1 described above or in the reverse order thereof.

If this drive circuit is used, the rotational position of the convex pole rotor of the motor 21 and the speed instruction pulse can be synchronized with each other by the AND gate circuit 29. Therefore, switching of the two-phase excitation can always be performed at set rotational positions of the convex rotor, and high speed rotation can be maintained by preventing loss of synchronization. That is, when the load torque is low and the frequency of excitation switching is relatively low, the delay angle or the displacement angle θ between the poles of the rotor 6 and the stator 1 becomes small. The displacement angle θ becomes large when the load torque becomes large, and loss of synchronization appears when the displacement angle θ exceeds 90°. However, according to the drive circuit, switching of two-phase excitation can be performed at excellent timings so that loss of synchronization can be prevented since the displacement angle θ is detected by the position detection signal generator circuit 30, and a logical product with respect to the speed instruction pulse is obtained by the AND gate circuit 29 and is inputted to the ring counter 34.

If the speed instruction pulse is increased, the phase currents are reduced due to counter electromotive forces and the torque generated is reduced so that the rotor speed might not follow up. It is however possible to respond to this case by increasing the voltage of ±E to increase the rotation speed.

In addition, it is desirable that the displacement angle θ is about 60° which is close to the peak value of the stiffness characteristic, and the displacement angle can be adjusted appropriately depending on the rotation speed and the load conditions. That is, when the load is light, the delay amount of the delay circuit 33 is enlarged and the position detection signal from the position detection signal generator circuit 30 is thereby delayed by a relatively long period, so that the displacement angle θ is reduced to reduce the torque to be generated. When the load is heavy or during acceleration, the delay amount of the delay circuit 33 is reduced and the position detection signal from the position detection signal generator circuit 30 is thereby delayed by a relatively short period, so that the displacement angle θ is enlarged and the torque to be generated is increased. Thus, high speed rotation can be maintained.

[Second Embodiment]

Next, a second embodiment of the present invention will be explained below.

In the first embodiment described above, the convex poles 4a to 4d are provided at an equal pitch (of 90°). However, in the second embodiment, as shown in FIG. 24, the width of each of the convex poles 4a to 4d of the convex rotor 6 is reduced, and the angle between the convex pole 4a as a N-pole and the convex pole 4b as a S-pole, as well as the convex pole 4c and the convex pole 4d, is set to 60°.

Figure 24:
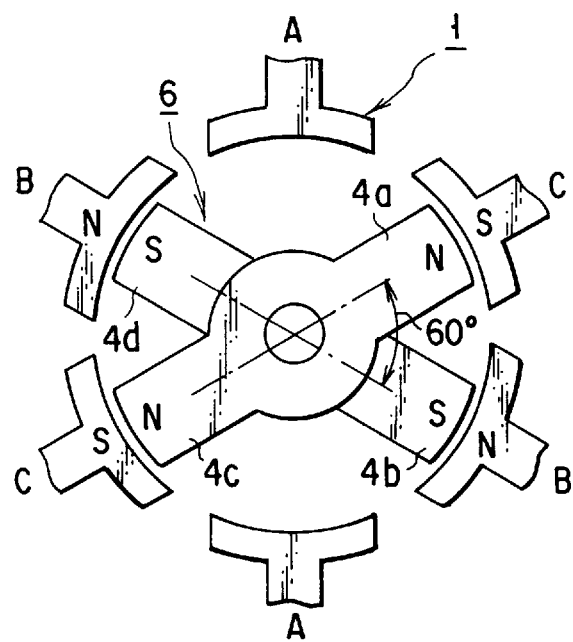
FIG. 24 is a view showing equilibrium of a three-phase motor based on a second embodiment of the present invention.

FIG. 24 shows equilibrium where the phase B of the stator 1 is excited in N-polarity and the phase C is excited in S-polarity with the phase A not excited. For example, the stiffness characteristic is indicated by the graph g6 in FIG. 9 and high torque can be obtained, where the angle between the convex N-poles and the convex S-poles is set to 68°.

In case where the angle is 60°, the torque is slightly higher than the above case (as indicated by the graph g6' in FIG. 9). In case where the angle is 76°, the torque is slightly lower (as indicated by the graph g6" in FIG. 9), on the contrary. In any cases, the angle between the convex N-poles and the convex S-poles desirably falls within the range of 60° to 76° to obtain high torque.

By thus setting the angle between the convex N-poles and the convex S-poles within the range of 60° to 76°, it is possible to obtain torque which is as high as the proper width verified in the case of the first embodiment even if the width of each of the convex poles of the convex pole rotor 6 is reduced. In this time, the peak value shifts from the displacement angle θ of 60° to 45° as can be seen from the graph g6 in FIG. 9. In addition, in this case, the width of each of the convex poles can be reduced, so that the size and weight of the rotor can be reduced and the size and weight of the motor can be reduced accordingly. Further, high speed operation can be achieved by reducing the size and weight of the rotor. Since the rotor can thus be downsized, a space for passing a fluid can be sufficiently maintained between the rotor and the stator in case where the motor is adopted to a pump motor. Accordingly, rotor blades and fluid passages can be formed at a high degree of freedom.

The present invention is not limited to the first and second embodiments described above but can be variously modified in practice without deviating from the scope of the invention.

For example, the above embodiments have been explained with respect to the case where the number of magnetic poles of the stator is six and the number of convex poles of the convex pole rotor is four. However, the present invention is not limited to this case but is applicable to the case of using twelve magnetic poles and eight convex poles. In this case, however, the angle of one step is 15°, and the angle between the magnetic poles of the stator and the convex poles of the convex pole rotor when high torque is obtained falls within the range of 30° to 38°, even if the width of each of the convex poles of the convex pole rotor is reduced.

I claim:

1. A three-phase reluctance motor comprising:

a stator having a plurality of magnetic poles around which coils corresponding to three phases are wound;

a rotatable rotor having a plurality of convex poles opposed to the magnetic poles of the stator;

a magnet provided on the rotor for magnetizing alternately the convex poles to N- and S-polarities in a circumferential direction; and a control circuit for magnetically exciting selectively only two of the three phases to the N- and S-polarities, respectively, and for sequentially switching two phases which are to be excited, to thereby rotate and drive the rotor;

wherein the stator and the rotor are arranged so as to maintain equilibrium in a two-phase excitation state, and are formed such that in the equilibrium, when phases to be excited next are excited to polarities which are different from the polarities of the convex poles of the rotor and phases currently excited are not excited, a magnetic force of attraction between the magnetic poles excited and the convex poles of the rotor is greater than a magnetic force of attraction between the magnetic poles not excited and the convex poles of the rotor; and wherein a width of each of the convex poles of the rotor and a width of each of the magnetic poles of the stator are adjusted such that in the equilibrium, side ends of the convex poles of the rotor in a widthwise direction thereof substantially oppose side ends of magnetic poles of the phases to be excited next in a widthwise direction thereof.

2. A motor according to claim 1, wherein the side ends of the convex poles of the rotor in the widthwise direction thereof substantially oppose side ends of magnetic poles of the phases to be excited next in the widthwise direction thereof with a tolerance in the circumferential direction which is four to five times greater than an air gap between the rotor and the stator.

3. A motor according to claim 1, wherein the rotor is formed by layering I-shaped members in an axial direction of a rotation shaft, and each of the I-shaped members is provided with a magnet and has an intermediate portion in a lengthwise direction thereof held on a rotation shaft, at angles shifted from each other.

4. A motor according to claim 1, wherein the magnets of the I-shaped members are embedded at projecting end portions of the convex poles.

5. A motor according to claim 1, wherein:

the stator has six magnetic poles, the rotor has four convex poles, the control circuit comprises a signal generator circuit which generates a rotational position detection signal by detecting a rotational position of the convex pole rotor for every 30° of rotation, and the convex pole rotor is rotated and driven by sequentially performing excitation phase switching by a logical product output obtained by multiplying a speed instruction pulse for controlling rotation speed and the rotational position detection signal generated by the signal generator circuit.

6. A motor according to claim 5, further comprising a timing adjuster circuit which adjusts timing of the rotational position detection signal generated by the signal generator circuit in accordance with a rotation signal, and wherein the convex pole rotor is rotated and driven by sequentially performing the excitation phase switching by the logical product output obtained by multiplying the rotational position detection signal by the speed instruction pulse.

7. A motor according to claim 1, wherein:

the stator has twelve magnetic poles, the rotor has eight convex poles, the control circuit comprises a signal generator circuit which generates a rotational position detection signal by detecting a rotational position of the convex pole rotor for every 15° of rotation, and the convex pole rotor is rotated and driven by sequentially performing excitation phase switching by a logical product output obtained by multiplying a speed instruction pulse for controlling rotation speed by the rotational position detection signal generated by the signal generator circuit.

8. A motor according to claim 7, further comprising a timing adjuster circuit which adjusts timing of the rotational position detection signal generated by the signal generator circuit in accordance with a rotation signal, and wherein the convex pole rotor is rotated and driven by sequentially performing the excitation phase switching by the logical product output obtained by multiplying the rotational position detection signal by the speed instruction pulse.

9. A motor according to claim 1, wherein:

the stator has six magnetic poles, the rotor has four convex poles, and an angle between the convex poles of the N-polarity and the convex poles of the S-polarity is set within a range of 60° to 76°.

10. A motor according to claim 9, wherein the control circuit comprises a signal generator circuit which generates a rotational position detection signal by detecting a rotational position of the convex pole rotor for every 30° of rotation, and wherein the convex pole rotor is rotated and driven by sequentially performing excitation phase switching by a logical product output obtained by multiplying a speed instruction pulse for controlling rotation speed and the rotational position detection signal generated by the signal generator circuit.

11. A motor according to claim 1, wherein:

the stator has twelve magnetic poles, the rotor has eight convex poles, and an angle between the convex poles of the N-polarity and the convex poles of the S-polarity is set within a range of 30° to 38°.

12. A motor according to claim 11, wherein the control circuit comprises a signal generator circuit which generates a rotational position detection signal by detecting a rotational position of the convex pole rotor for every 15° of rotation, and wherein the convex pole rotor is rotated and driven by sequentially performing excitation phase switching by a logical product output obtained by multiplying a speed instruction pulse for controlling rotation speed by the rotational position detection signal generated by the signal generator circuit.

* * * * *